(12) United States Patent
Clontz et al.

(10) Patent No.: US 6,262,211 B1
(45) Date of Patent: Jul. 17, 2001

(54) POLYMERIZABLE POLYOL(ALLYL CARBONATE) COMPOSITION

(75) Inventors: Charles C. Clontz, Corapolis, PA (US); Noriyuki Someki, Chiba (JP); Robert A. Smith, Murrysville; Michael O. Okoroafor, Export, both of PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/596,477

(22) Filed: Jun. 19, 2000

Related U.S. Application Data

(63) Continuation-in-part of application No. 09/211,829, filed on Dec. 15, 1998, now abandoned.
(60) Provisional application No. 60/073,071, filed on Jan. 30, 1998.

(51) Int. Cl.[7] ............................ C08F 290/06; C08F 18/24
(52) U.S. Cl. ...................... 526/314; 526/281; 526/282; 526/319; 526/321
(58) Field of Search ..................... 526/281, 282, 526/314, 319, 321

(56) References Cited

U.S. PATENT DOCUMENTS

| | | |
|---|---|---|
| 2,370,567 | 2/1945 | Muskat et al. ................ 260/463 |
| 2,403,113 | 7/1946 | Muskat et al. ................ 260/78 |
| 4,637,698 | 1/1987 | Kwak et al. .................. 351/163 |
| 4,879,363 | 11/1989 | Fujio et al. .................. 526/314 |
| 4,959,451 | 9/1990 | Uchida et al. ................ 528/272 |
| 5,130,393 | 7/1992 | Nakamura .................... 526/314 |
| 5,196,492 | 3/1993 | Renzi et al. ................. 526/210 |
| 5,204,430 | 4/1993 | Renzi et al. ................. 526/314 |
| 5,218,067 | 6/1993 | Uchida et al. ................ 526/261 |
| 5,380,809 | 1/1995 | Uchida et al. ................ 526/318.43 |
| 5,663,279 | 9/1997 | Kuiper et al. ................ 528/196 |
| 6,077,921 | 6/2000 | Nagpal et al. ................ 526/314 |

FOREIGN PATENT DOCUMENTS

| | | |
|---|---|---|
| 715 725 | 2/1998 | (EP) . |
| WO 95/06266 | 3/1995 | (WO) . |
| WO 96/24865 | 8/1996 | (WO) . |
| WO 99/38899 | 5/1999 | (WO) . |
| Wo 99/17137 | 8/1999 | (WO) . |

*Primary Examiner*—Helen L. Pezzuto
(74) *Attorney, Agent, or Firm*—Carol A. Marmo; James R. Franks

(57) ABSTRACT

Describes a polymerizable organic composition comprising a polyol(allyl carbonate), e.g., diethylene glycol bis(allyl carbonate), and from 0.1 percent to 10 percent by weight, based on the total weight of the composition, of an allyl ester terminated nonaromatic polyester, e.g., diallyl 4-methyl-1, 2-cyclohexanedicarboxylate oligomer with 1,4-butane diol. Polymerizates prepared from polymerizable organic compositions of the present invention have a refractive index of less than 1.53, e.g., from 1.49 to 1.50, and are substantially free of defects due to tinting failure.

12 Claims, 1 Drawing Sheet

POLYMERIZABLE POLYOL(ALLYL CARBONATE) COMPOSITION

CROSS REFERENCE TO RELATED APPLICATIONS

This application is an continuation-in-part of U.S. patent application Ser. No. 09/211,829 filed Dec. 15, 1998, now abandoned, which is a nonprovisional application claiming priority under 35 U.S.C. §119(e)(1) of U.S. Provisional patent application Ser. No. 60/073,071 filed Jan. 30, 1998.

DESCRIPTION OF THE INVENTION

The present invention relates to polymerizable organic compositions and polymerizates prepared from such compositions. More particularly, the present invention relates to certain polymerizable organic compositions comprising a polyol(allyl carbonate) and an allyl ester terminated non-aromatic polyester oligomer, and polymerizates obtained from said organic compositions that are substantially free of tinting defects.

Polymerizable organic compositions based on polyol (allyl carbonate), particularly diethylene glycol bis(allyl carbonate), and polymerizates obtained therefrom are well known in the art. Polymerizates of polymerizable organic compositions based on homopolymers of diethylene glycol bis(allyl carbonate) possess excellent clarity, good flexibility and abrasion resistance, examples of which include, ophthalmic lenses, sunglasses, and automotive and aircraft transparencies. It has been observed that tinting of polymerizates prepared from such compositions by surface impregnation of dyes can in certain instances result in an uneven tinting of the surface. Such uneven tinting is referred to as tinting failure.

When tinting failure occurs, it is often manifested as visually observable defects on the tinted surface(s) of the polymerizate, which are commonly referred to as, for example, "ferns" or "moons." In the case of tinted ophthalmic lenses, such as tinted ophthalmic lenses having a positive diopter, i.e., plus lenses, and non-corrective lenses, e.g., sunglasses, such tinting failure often results in rejection and scrapping of the tinted lens.

A common method of producing ophthalmic lenses involves the use of molds, the interior dimensions of which are fabricated to allow the casting of lenses that provide a predetermined degree of optical correction, e.g., a correction for myopia. Such a production method produces lenses that require a minimum of post-casting preparation, e.g., grinding to a desired degree of visual correction. This production method requires that the polymerizable composition from which the lenses are cast have a known and tightly controlled refractive index. If the refractive index of a reformulated polymerizable composition charged to the molds changes significantly, e.g., increases by more than 0.006 units of refractive index, then the resulting cast lens will not have the desired degree of optical correction and may either be scrapped or require additional post-casting work, e.g., grinding.

Polymerizates obtained from polymerizable organic compositions comprising polyol(allyl carbonate) monomers, and in particular diethylene glycol bis(allyl carbonate) monomer, are commonly referred to as low index materials having refractive indices of from about 1.48 through 1.53, e.g., from 1.49 to 1.50. In light of the above described production process, it is desirable that additives and radically polymerizable comonomers and oligomers used to reformulate such polymerizable compositions not substantially alter, e.g., increase, the refractive index of the resulting polymerizate.

It is accordingly desirable to identify new polymerizable organic compositions comprising polyol(allyl carbonate) monomers that can be used to prepare polymerizates that are substantially free of defects due to tinting failure. It is further desirable that these new compositions have refractive indices that are substantially equivalent to those of the corresponding original compositions comprising polyol(allyl carbonate) monomer.

U.S. Pat. No. 5,380,809 describes a composition for an optical material consisting essentially of a polyallyl carbonate of linear or branched alkylene glycols, an allyl ester oligomer having allyl ester groups at the terminal ends thereof and a main chain derived from an alicyclic dicarboxylic acid and a polyhydric saturated alcohol, and optionally a third monomer, e.g., a diallyl ester. To achieve a desirable balance of viscosity and shrinkage ratio, the allyl ester oligomer is disclosed as being present in the composition in an amount of from 20 percent to 70 percent by weight.

International publication number WO 99/17137 describes ophthalmic lenses comprising the cured product of a composition of poly(allyl carbonate) of a polyhydroxy alcohol, at least one radical initiator, and a cyclohexyl diallyl ester oligomer. The cyclohexyl diallyl ester oligomer is described in WO 99/17137 as being present in the composition in an amount of 0.05 to 60 weight percent.

It has now been discovered that cured polymerizates prepared from polymerizable organic compositions of the present invention are substantially free of defects due to tinting failure, and have refractive indices that are substantially equivalent to comparative original polyol(allyl carbonate) compositions. In accordance with the present invention, there is provided a polymerizable organic composition comprising:

(a) a radically polymerizable monomer represented by the following general formula I,

$$R \text{---}[\text{---}O\text{---}C(O)\text{---}O\text{---}R_1]_i \qquad \qquad I$$

wherein R is a radical derived from a polyol having two or more hydroxy groups, $R_1$ is a radical derived from an allyl or substituted allyl group and i is a whole number from 2 to 4; and (b) from 0.1 percent by weight to 10 percent by weight, based on the total weight of radically polymerizable components of the polymerizable organic composition, of a polyester oligomer having terminal allyl ester groups represented by the following general formula II,

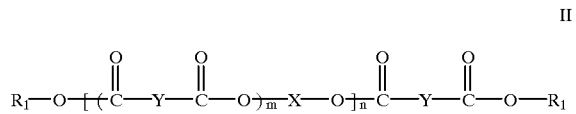

$$R_1\text{---}O\text{-}\!\!\left[\!\!\left(\text{C}\overset{\overset{\displaystyle O}{\|}}{}\text{---}Y\text{---}\overset{\overset{\displaystyle O}{\|}}{\text{C}}\text{---}O\right)_{\!m}\!\!\!\text{---}X\text{---}O\right]_{\!n}\!\!\overset{\overset{\displaystyle O}{\|}}{\text{C}}\text{---}Y\text{---}\overset{\overset{\displaystyle O}{\|}}{\text{C}}\text{---}O\text{---}R_1 \qquad II$$

wherein $R_1$ has the same meaning as that described for monomer (a), m is a whole number of from 1 to 6, X is a polyvalent linking group derived from at least one polyol selected from polyols having m+1 hydroxy groups and from 2 to 30 carbon atoms, Y is a divalent linking group selected from the group consisting of the following representative general formulas, consisting of the following representative general formulas III through VII,

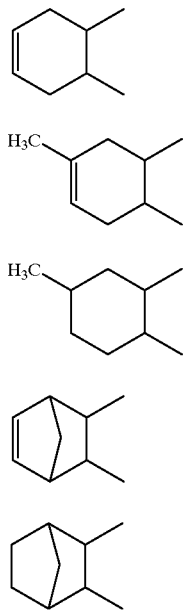

and mixtures thereof, and n is a number of from 1 to 100.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying illustrative drawing.

Other than in the operating examples, or where otherwise indicated, all numbers or expressions referring to quantities of ingredients, reaction conditions, etc. used in the specification and claims are to be understood as modified in all instances by the term "about."

DETAILED DESCRIPTION OF THE INVENTION

Figure 1:
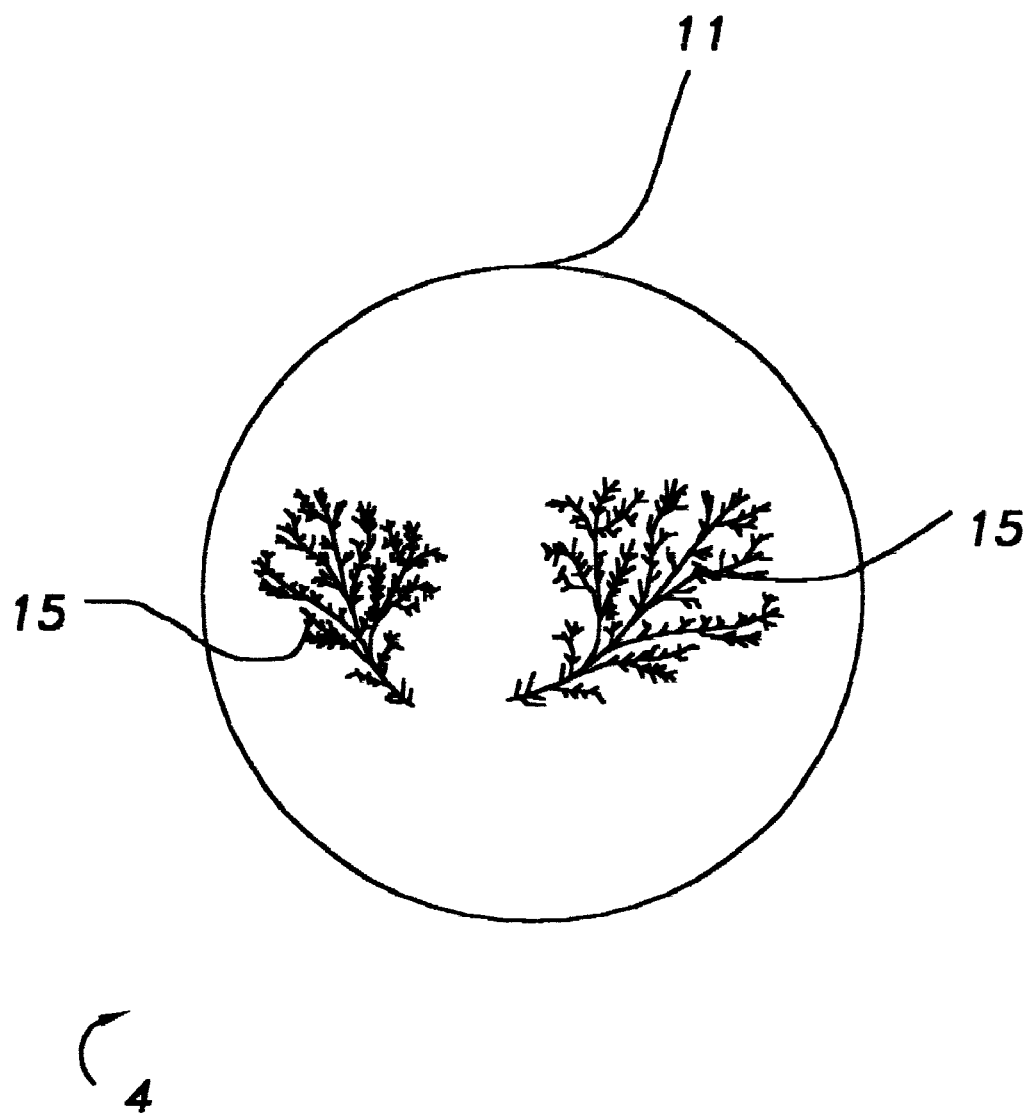
FIG. 1 is a representation of a negative image of a tinted lens having tinting defects.

Polymerizates prepared from polymerizable organic compositions according to the present invention are substantially free of tinting defects. As used herein, the term "tinting defects" and similar terms refer generally to a visually observable uneven distribution of dye over the surface of a tinted polymerizate, such as a tinted lens. More particularly, tinting defects are often visually observable as lighter colored or untinted surface patterns, sometimes in the form of ferns or moons.

Tinting defects in the form of ferns can be further described with reference to FIG. 1. The tinted polymerizate 4 of FIG. 1 is composed of a tinted plus lens 11, prepared from diethylene glycol bis(allyl carbonate) monomer, and having tinting defects 15 thereon. For purposes of illustration, the tinting defects 15 of FIG. 1 are shown as a negative image. As used herein, by "plus lens" is meant a lens having a positive (+) diopter, i.e., a lens having a positive focal length or real focal point. The tinting defects shown in the lens depicted in FIG. 1 were observed in a lens having a +5 diopter.

Tinting defects in the form of moons are typically observed as a series of concentric circles of varying tint strength on the surface of the tinted lens. In some instances a tinted lens will exhibit a combination of both moon and fern type tinting defects.

The occurrence of tinting defects with polymerizates prepared from polyol(allyl carbonate) monomers is a largely statistical phenomenon. Accordingly, in order to determine if a polymerizable composition can be used to prepare polymerizates that are "substantially free of tinting defects," more than one polymerizate, e.g., several lenses, should be prepared. Optionally, a set of comparative polymerizates may also be prepared under similar conditions, e.g., using the same cure cycle, from a composition that is known to result in tinting defects. The specific number of polymerizates that must be prepared is often determined by trial and error. In the case of ophthalmic lenses, typically between 10 and 100 lenses are prepared to determine if they are substantially free of tinting defects. Such a determination is described in further detail in the Examples herein.

The polymerizable organic composition of the present invention includes a radically polymerizable monomer as described above with reference to general formula I, which may be further described as a polyol(allyl carbonate) monomer. Polyol(allyl carbonate) monomers that may be used in the aforedescribed polymerizable organic composition are allyl carbonates of, for example, linear or branched aliphatic polyols, e.g., aliphatic glycol bis(allyl carbonate) compounds, and cycloaliphatic polyols. The scope of the present invention also includes allyl carbonates of aromatic polyols, e.g., 4,4'-isopropylidenediphenol bis(allyl carbonate), but typically only in amounts that will not result in a polymerizate having a refractive index of greater than 1.53. These monomers may further be described as unsaturated polycarbonates of polyols, e.g., glycols. The polyol (allyl carbonate) monomer may be prepared by procedures well known in the art, e.g., as described in U.S. Pat. Nos. 2,370,567 and 2,403,113.

In reference to general formula I, $R_1$ is a radical derived from an allyl group which may be substituted at the 2-position with a halogen, most notably chlorine or bromine, or an alkyl group containing from 1 to 4, e.g., 1 to 2, carbon atoms. Generally, the alkyl substituent is methyl or ethyl. The $R_1$ radical may be represented by the following general formula IX:

$$H_2C=C(R_2)-CH_2- \qquad IX$$

wherein $R_2$ is hydrogen, halogen or a $C_1$ to $C_4$ alkyl group. Most commonly, $R_2$ is hydrogen and consequently $R_1$ is the unsubstituted allyl group, $H_2C=CH-CH_2-$.

With reference to general formula I, R is a polyvalent radical derived from a polyol, which can, for example, be an aliphatic or cycloaliphatic polyol, containing 2, 3 or 4 hydroxy groups. Typically, the polyol contains 2 hydroxy groups, i.e., a glycol. When the polyol is an aliphatic polyol, it may be linear or branched and contain from 2 to 10 carbon atoms. Commonly, the aliphatic polyol is an alkylene glycol having from 2 to 4 carbons atoms, e.g., ethylene glycol, propylene glycol, trimethylene glycol, tetramethylene glycol, or a poly($C_2-C_4$) alkylene glycol, e.g., diethylene glycol, triethylene glycol, etc.

Specific examples of polyol(allyl carbonate) monomers that may be used in the present invention include, but are not limited to, ethylene glycol bis(2-chloroallyl carbonate), ethylene glycol bis(allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propane diol bis(allyl carbonate), 1,3-butane diol bis(allyl carbonate), 1,4-butane diol bis(2-bromoallyl carbonate), dipropylene glycol bis(allyl carbonate), trimethylene glycol bis(2-ethylallyl carbonate), pentamethylene glycol bis(allyl carbonate), 1,4-cyclohexane diol bis(allyl carbonate) and 4,4'-isopropylidenebiscyclohexanol bis(allyl carbonate). The preferred polyol(allyl carbonate) monomer is diethylene glycol bis(allyl carbonate).

A detailed description of polyol(allyl carbonate) monomers that may be used in the polymerizable organic compositions of the present invention may be found in U.S. Pat. No. 4,637,698 at column 3, line 33 through column 5, line 61. That disclosure is hereby incorporated by reference and is summarized above.

As used in the present description with reference to the radically polymerizable monomer represented by general formula I, the term polyol(allyl carbonate) monomer or like names, e.g., diethylene glycol bis(allyl carbonate), is intended to mean and include the named monomers or prepolymers thereof and any related monomer or oligomer species contained therein.

The polyol(allyl carbonate) monomer represented by general formula I is typically present in the polymerizable organic composition of the present invention in an amount of at least 90 percent by weight, preferably at least 93 percent by weight, and more preferably at least 95 percent by weight, based on the total weight of radically polymerizable components of the polymerizable organic composition. Also, the polyol(allyl carbonate) monomer is typically present in the composition in an amount of not greater than 99.9 percent by weight, preferably not greater than 99.5 percent by weight, more preferably not greater than 99 percent by weight, and in particular not greater than 98 percent by weight, based on the total weight of radically polymerizable components of the polymerizable organic composition. The polyol(allyl carbonate) monomer may be present in the composition of the present invention in an amount ranging between any combination of these values, inclusive of the recited values.

Polymerizable organic compositions in accordance with the present invention comprise also an allyl ester terminated nonaromatic polyester oligomer, as described with reference to general formula II above. By the term "nonaromatic polyester" is meant a polyester the backbone of which is substantially free of residues derived from either aromatic polybasic carboxylic acids, e.g., terephthalic acid, or aromatic polyhydric alcohols, e.g., 1,4-dihydroxy benzene.

The allyl ester terminated polyester oligomer may be synthesized by art recognized methods, which include, for example, one step and two step processes. The two step process typically involves first preparing a carboxylic acid or carboxylate terminated polyester from the reaction of polybasic carboxylic acid, e.g., 4-methyl-1,2-cyclohexane dicarboxylic acid, or polybasic carboxylic acid ester, e.g., diisopropyl-4-methyl-1,2-cyclohexane dicarboxylate, and a polyhydric alcohol, e.g., propylene glycol. In the second step, the carboxylic acid or carboxylate terminated polyester is further reacted or capped with allyl alcohol or a substituted allyl alcohol, e.g., 2-ethylallyl alcohol. In the one step method, an allyl ester having two or more allyl ester groups, e.g., diallyl-4-methyl-1,2-cyclohexane dicarboxylate, is transesterified with a polyhydric alcohol, e.g., propylene glycol, while allyl alcohol is removed, typically by vacuum distillation, from the reaction mixture.

With reference to general formula II, Y is described as a divalent linking group selected from representative general formulas III through VII. Depending on how the allyl ester terminated polyester oligomer is synthesized, Y, more specifically, may be a divalent linking group derived from a dicarboxylic acid or dicarboxylic acid ester. For example, the divalent linking groups represented by general formulas III through VIII can be described as being derived from the following corresponding dicarboxylic acids: 4-cyclohexene-1,2-dicarboxylic acid; 4-cyclohexene-5-methyl-1,2-dicarboxylic acid; 4-methyl-1,2-cyclohexane dicarboxylic acid; 5-norborene-2,3-dicarboxylic acid; and norborane-2,3-dicarboxylic acid, respectively. In a preferred embodiment of the present invention, Y is the divalent linking group represented by general formula V, wherein, for example, Y is derived from 4-methyl-1,2-cyclohexane dicarboxylic acid.

Polyols from which X of general formula II may be derived are preferably saturated polyols having m+1 hydroxy groups, wherein m is a whole number preferably from 1 to 3 and more preferably 1 or 2. Examples of diols from which X may be derived include, but are not limited to, ethylene glycol, propylene glycol (1,2-propane diol), 1,3-propane diol, 1,4-butane diol, 2-methyl-1,3-propane diol, 1,3-butane diol, neopentyl glycol, 1,5-pentane diol, hexamethylene glycol, heptamethylene glycol, octamethylene glycol, nonamethylene glycol, decamethylene glycol, undecamethylene glycol, dodecamethylene glycol, tridecamethylene glycol, hydrogenated bis-phenol A, 1,4-cyclohexane dimethanol, 2-ethyl-2,5-pentane diol and 2-ethyl-1,3-hexane diol. Examples of saturated diols having ether linkages from which X may be derived include, but are not limited to, diethylene glycol, triethylene glycol, polyethylene glycol and dipropylene glycol. Preferred diols include, ethylene glycol, propylene glycol, 1,3-butane diol, 1,4-butane diol and neopentyl glycol.

Examples of polyols having more than two hydroxy groups from which X may be derived include, but are not limited to, glycerol, trimethylolethane, trimethylolpropane, di- trimethylolpropane, pentaerythritol, di-pentaerythritol and sorbitol. The amount of polyol having more than two hydroxy groups used to prepare the allyl ester terminated polyester oligomer is typically small relative to the amount of diol used, e.g., less than half the moles of diol used. If too much polyol having three or more hydroxy groups is used, the polymerizable organic composition of the present invention may, for example, cure too quickly and result in a polymerizate having undesirable thermal properties and / or a crosslink density so high as to inhibit tinting with dyes.

When the allyl ester terminated oligomer is prepared from polyols having 2 hydroxy groups and/or polyols having more than 2 hydroxy groups, e.g., 1,4-butane diol and/or trimethylolpropane, the resulting oligomer will have more than two terminal allyl ester groups, as is known to the skilled artisan. Accordingly, general formula II is understood to represent polyester oligomers having two or more terminal allyl ester groups.

The allyl ester terminated polyester oligomer useful in the present invention, typically has a number average molecular weight (Mn) (as determined by gel permeation chromatography (GPC) using polyethylene glycol standards) of at least 400. The Mn is also typically no greater than 35,000, preferably no greater than 10,000, and more preferably no greater than 5000. The Mn of the allyl ester terminated polyester oligomer may range between any combination of these values, inclusive of the recited values. The value of n in general formula II is preferably from 1 to 50, and more preferably from 1 to 10.

As used in the present description with reference to general formula II, the term "allyl ester terminated polyester oligomer" or like names, e.g., diallyl 4-methyl-1,2-cyclohexanedicarboxylate oligomer with 1,4-butane diol, is intended to mean and include the named oligomer or mixtures of such oligomers and any related monomer species contained therein.

The allyl ester terminated polyester oligomer is typically present in the polymerizable organic composition of the present invention in an amount of at least 0.1 percent by weight, preferably at least 0.5 percent by weight, more preferably at least 1 percent by weight and in particular at least 2 percent by weight, based on the total weight of radically polymerizable components of the polymerizable organic composition. Also, the allyl ester terminated polyester oligomer is typically present in the composition in an amount of not greater than 10 percent by weight, preferably not greater than 7 percent by weight, and more preferably not greater than 5 percent by weight, based on the total weight of radically polymerizable components of the polymerizable organic composition. The allyl ester terminated polyester oligomer may be present in the composition of the present invention in an amount ranging between any combination of these values, inclusive of the recited values.

Amounts of allyl ester terminated polyester oligomer in excess of 10 weight percent, based on the total weight of radically polymerizable components of the composition, are undesirable in the present invention due to an increase in viscosity, which makes the polymerizable composition hard to handle, e.g., inject into a mold. In addition, when the allyl ester terminated polyester oligomer is present in the composition in amounts exceeding 10 weight percent, based on the total weight of radically polymerizable components of the composition, there is typically an undesirably greater occurrence of defects due to pre-release of the polymerizable composition from the interior surfaces of the mold during casting operations.

Polymerization of the polymerizable organic composition of the present invention may be accomplished by adding to the composition an initiating amount of material capable of generating free radicals, such as organic peroxy compounds, i.e., an initiator. Methods for polymerizing polyol(allyl carbonate) compositions are well known to the skilled artisan and any of those well known techniques may be used to polymerize the aforedescribed polymerizable organic compositions.

Suitable examples of organic peroxy compounds, that may be used as initiators include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting polymerizate. A preferred initiator is diisopropyl peroxydicarbonate.

Various conventional additives may be incorporated into the polymerizable organic composition of the present invention. Such additives may include light stabilizers, heat stabilizers, ultraviolet light absorbers, mold release agents, pigments and flexibilizing additives that are not radically polymerizable, e.g., alkoxylated phenol benzoates and poly (alkylene glycol) dibenzoates. Such additives are typically present in the compositions of the present invention in amounts totaling less than 10 percent by weight, preferably less than 5 percent by weight, and more preferably less than 3 percent by weight, based on the total weight of the polymerizable composition.

Polymerizates obtained from polymerization of polymerizable organic compositions of the present invention will be solid and transparent. The polymerizates of the present invention will also have a refractive index of from 1.48 to 1.53 (e.g., from 1.49 to 1.50, and more specifically from 1.490 to 1.504) in addition to being substantially free of defects due to tinting failure.

The monomers and oligomers comprising the polymerizable organic composition of the present invention, i.e., polyol(allyl carbonate) monomer (a) and allyl ester terminated polyester oligomer (b), are selected and used in amounts that allow the preparation of a polymerizate therefrom, which possesses the above listed characteristics. For example, in a preferred embodiment of the present invention, the polymerizable organic composition comprises: from 95 percent to 99 percent by weight of polyol (allyl carbonate) monomer (a), e.g., diethylene glycol bis (allyl carbonate), and more particularly HIGH ADC CR-39® Monomer, Chemical Abstracts (CAS) No. 142-22-3, available commercially from PPG Industries Inc.; and from 1 percent to 5 percent by weight of allyl ester terminated polyester oligomer (b), e.g., diallyl 4-methyl-1,2-cyclohexanedicarboxylate oligomer with 1,4-butane diol, having an Mn of 730 (as determined by GPC using polyethylene glycol standards), all percent weights being based on the total weight of the radically polymerizable components (a) and (b). Solid articles that may be prepared from polymerizable organic compositions of the present invention include, but are not limited to, optical lenses, such as plano and ophthalmic lenses, sun lenses or sunglasses, windows, automotive transparencies, e.g., windshields, sidelights and backlights, and aircraft transparencies, etc.

The present invention is more particularly described in the following examples, which are intended to be illustrative only, since numerous modifications and variations therein will be apparent to those skilled in the art. Unless otherwise specified, all parts and percentages are by weight.

Casting Composition Examples

The following summarizes polymerizable organic casting compositions that are comparative and according to the present invention. Casting composition A represents a comparative composition, and Casting compositions B through D represent compositions according to the present invention.

| | Casting Compositions | | | |
|---|---|---|---|---|
| Ingredients | A | B | C | D |
| Polyol (allyl carbonate) monomer (a) | 100 | 99.5 | 99 | 97 |
| IPP (b) | 2.60 | 2.77 | 2.76 | 3.15 |
| Allyl ester terminated oligomer (c) | 0 | 0.5 | 1 | 3 |

(a) HIGH ADC CR-39 ® diethylene glycol bis(allyl carbonate) monomer, CAS No. 142-22-3, available commercially from PPG Industries, Inc.
(b) diisopropyl peroxydicarbonate.
(c) An allyl ester terminated polyester oligomer prepared from 4-methyl-1, 2-cyclohexanedicarboxylic acid anhydride and 1,4-butane diol, having a iodine value of 68.2, a viscosity of 8240 mPa·s, a refractive index of 1.488, a number average molecular weight of 730, and a weight average molecular weight of 1600 (as determined by gel permeation chromatography using polyethylene glycol standards), obtained from Showa Denko K.K.

Cast Lens Examples

The casting compositions A–D were each mixed at room temperature and injected separately into glass molds used to prepare circular lenses having a +5 diopter and an outer rim diameter of 65 mm. Twenty (20) lens molds were filled at a time and their contents polymerized using the same cure cycle. The cure cycle used involved heating the filled molds in stages from room temperature to 85° C. in an electric forced air oven over a period of 17 hours, followed by demolding of the cast lenses.

The cast lenses were then tinted to substantially the same degree, i.e., to a percent transmittance of about 34 percent, by imbibing them with a black dye. The percent transmittance was determined using a HunterLab Model ColorQuest II colorimeter employing the CIE Tristimulus XYZ scale, illuminant D65 and 10° C. observer. To obtain the same degree of tinting, the IPP level in casting compositions B, C and D was increased relative to the level of IPP in casting composition A.

The cast lenses were tinted as follows. An aqueous tinting solution of 1 part BPI® Molecular Catalytic™ Black Dye, commercially available from Brain Power Incorporated, and 10 parts deionized water was heated to and held at a temperature of 95° C. The lenses cast from Casting Compositions A–D were fully immersed in the heated dye solution for a period of 5 minutes, after which they were thoroughly rinsed with deionized water. The tinted lenses were evaluated for tinting defects, the results of which are summarized in Table 1.

TABLE 1

Evaluation of Tinted Lenses

| Casting composition | Number of tinted lenses evaluated (d) | Number of tinted lenses observed to have tinting defects (e) |
|---|---|---|
| A | 186 | 86 |
| B | 174 | 11 |
| C | 160 | 11 |
| D | 181 | 5 |

(d) Of the cast lenses prepared from each of Casting Compositions A–D, those that were visually observed to be defective upon demolding, e.g., as the result of pre-release, were not tinted, and accordingly were not evaluated for tinting defects.
(e) The lenses were evaluated for tinting defects by means of visual naked eye inspection. Tinting defects were observed as having a lighter colored vein or fern-like appearance relative to the rest of the tinted lens.

Untinted sheets having dimensions of 15.24×15.24×0.32 cm cast from compositions corresponding to Casting Compositions A, B, C and D were found to have refractive index values ($n_d^{20}$) of 1.4995, 1.4994, 1.5000 and 1.4995 respectively. The refractive index (RI) values were determined in accordance with American Standard Test Method (ASTM) number D 542-50 using a Bausch & Lomb Abbe-3L refractometer. The RI values of articles, e.g., sheets, cast from polymerizable organic compositions according to the present invention, such as Compositions B, C and D are not substantially different than the RI values of articles cast from comparative compositions, such as Composition A.

The results summarized in Table 1 show that articles, e.g., lenses, cast from polymerizable organic compositions according to the present invention, such as Compositions B through D, have substantially fewer tinting defects than lenses cast from comparative compositions, such as Composition A.

The present invention has been described with reference to specific details of particular embodiments thereof. It is not intended that such details be regarded as limitations upon the scope of the invention except insofar as and to the extent that they are included in the accompanying claims.

We claim:
1. A polymerizable organic composition comprising:
(a) a radically polymerizable monomer represented by the following general formula,

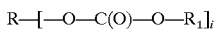

wherein R is a radical derived from a polyol having two or more hydroxy groups, $R_1$ is a radical derived from an allyl or substituted allyl group and i is a whole number from 2 to 4; and
(b) from 0.1 percent by weight to 10 percent by weight, based on the total weight of radically polymerizable components of the polymerizable organic composition, of a polyester oligomer having terminal allyl ester groups represented by the following general formula,

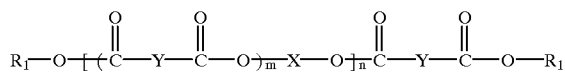

wherein $R_1$ has the same meaning as that described for monomer (a), m is a whole number of from 1 to 6, X is a polyvalent linking group derived from at least one polyol selected from polyols having m+1 hydroxy groups and from 2 to 30 carbon atoms, Y is a divalent linking group selected from the group consisting of the following representative general formulas,

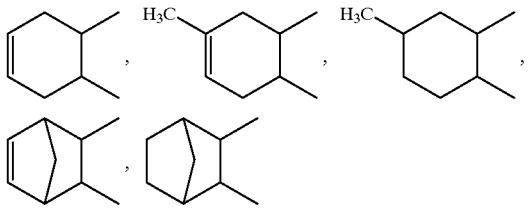

and mixtures thereof, and n is a number of from 1 to 100.
2. The polymerizable organic composition of claim 1 wherein the polyol from which R is derived is a poly($C_2$–$C_4$) alkylene glycol and i is 2.
3. The polymerizable organic composition of claim 2 wherein the polyol from which R is derived is diethylene glycol.
4. The polymerizable organic composition of claim 1 wherein the polyol from which X is derived is selected from the group consisting of ethylene glycol, propylene glycol, 1,3-butane diol, 2-methyl-1,3-propane diol, 1,4-butane diol, neopentyl glycol, glycerol, trimethylethane, trimethylolpropane, pentaerythritol, sorbitol and mixtures thereof.
5. The polymerizable organic composition of claim 4 wherein the polyol from which X is derived is selected from the group consisting of ethylene glycol, propylene glycol, 1,4-butane diol and mixtures thereof.
6. The polymerizable organic composition of claim 5 wherein the polyol from which X is derived is 1,4-butane diol.
7. The polymerizable organic composition of claim 1 wherein Y is represented by the following general formula,

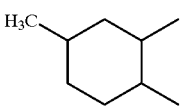

8. The polymerizable organic composition of claim 7 wherein i is 2, the polyol from which R is derived is diethylene glycol, $R_1$ is allyl, m is 1, the polyol from which X is derived is 1,4-butane diol, and n is from 1 to 50.

9. The polymerizable organic composition of claim 8 wherein said polyester oligomer having terminal allyl ester groups is present in an amount of from 0.5 percent to 7 percent by weight, based on the total weight of radically polymerizable components of the polymerizable organic composition.

10. The polymerizable organic composition of claim 1 wherein a polymerizate of said polymerizable composition has a refractive index of from 1.48 to 1.53.

11. The polymerizate of claim 1.

12. The polymerizate of claim 9.

* * * * *